(12) United States Patent
Donderici (10) Patent No.: US 12,400,115 B2
(45) Date of Patent: Aug. 26, 2025

(54) ONLINE LEARNING BY AN INSTANCE OF A DEEP LEARNING MODEL AND SHARING OF LEARNING WITH ADDITIONAL INSTANCES OF THE DEEP LEARNING MODEL

(71) Applicant: GM Cruise Holdings LLC, San Francisco, CA (US)

(72) Inventor: Burkay Donderici, Burlingame, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 856 days.

(21) Appl. No.: 17/668,930

(22) Filed: Feb. 10, 2022

(65) Prior Publication Data
US 2023/0252280 A1    Aug. 10, 2023

(51) Int. Cl.
| | |
|---|---|
| *G06N 3/08* | (2023.01) |
| *G06F 11/3668* | (2025.01) |
| *G06N 3/04* | (2023.01) |
| *G06N 3/0464* | (2023.01) |
| *G06N 3/084* | (2023.01) |
| *G06N 3/0895* | (2023.01) |
| *G06N 3/091* | (2023.01) |
| *G06N 3/096* | (2023.01) |
| *G06N 3/098* | (2023.01) |

(52) U.S. Cl.
CPC .......... *G06N 3/08* (2013.01); *G06F 11/3668* (2013.01); *G06N 3/04* (2013.01); *G06N 3/0464* (2023.01); *G06N 3/0895* (2023.01); *G06N 3/096* (2023.01); *G06N 3/098* (2023.01); *G06N 3/084* (2013.01); *G06N 3/091* (2023.01)

(58) Field of Classification Search
CPC .......... G06N 3/08; G06N 3/04; G06N 3/0464; G06N 3/0895; G06N 3/096; G06N 3/098; G06N 3/091; G06N 3/084; G06N 20/00; G06N 20/10; G06N 20/20; G06F 11/3668
See application file for complete search history.

(56) References Cited

U.S. PATENT DOCUMENTS

| | | | |
|---|---|---|---|
| 2018/0330238 A1* | 11/2018 | Luciw | G06N 3/045 |
| 2020/0364953 A1* | 11/2020 | Simoudis | G06N 20/00 |
| 2021/0354704 A1* | 11/2021 | Simoncini | G07C 5/008 |

(Continued)

OTHER PUBLICATIONS

"Christofer Fellicious ; Transfer Learning and Organic Computing for Autonomous Vehicles ; arXiv:1808.05443v1 [cs.LG] Aug. 16, 2018" (Year: 2018).*

*Primary Examiner* — Shane D Woolwine
(74) *Attorney, Agent, or Firm* — CANTOR COLBURN LLP (57) ABSTRACT

The subject disclosure relates to techniques for enabling sharing of knowledge among a fleet of autonomous vehicles. A process of the disclosed technology can include generating an update for a continuous deep learning neural network on-board the autonomous vehicle based on driving scenarios encountered by the autonomous vehicle during its deployment and providing the update for the continuous deep learning neural network to additional vehicles in the fleet on autonomous vehicles, wherein the update for the continuous deep learning neural network is configured to be incorporated into a joint kernel for use by the additional vehicles in the fleet on autonomous vehicles.

20 Claims, 7 Drawing Sheets

(56) References Cited

U.S. PATENT DOCUMENTS

| | | | |
|---|---|---|---|
| 2022/0126438 A1* | 4/2022 | Cristache | B25J 13/006 |
| 2022/0188695 A1* | 6/2022 | Zhu | G06N 3/08 |
| 2023/0026719 A1* | 1/2023 | Chan | G06V 10/771 |
| 2023/0211808 A1* | 7/2023 | Shah | G06T 7/246 |
| | | | 701/28 |

* cited by examiner

ONLINE LEARNING BY AN INSTANCE OF A DEEP LEARNING MODEL AND SHARING OF LEARNING WITH ADDITIONAL INSTANCES OF THE DEEP LEARNING MODEL

BACKGROUND

1. Technical Field

The subject technology pertains to online learning by an instance of a deep learning model and sharing the of learning with additional instances of the deep learning model deployed on other computing environments, and more particularly to enabling sharing of knowledge learned by an instance of a deep learning model on one vehicle in a fleet with additional instances of the deep learning model deployed on other vehicles of a fleet whereby all instances of the deep learning model can update a joint kernel with the learnings from all instances of the deep learning model.

2. Introduction

Autonomous vehicles are vehicles having computers and control systems that perform driving and navigation tasks that are conventionally performed by a human driver. As autonomous vehicle technologies continue to advance, ridesharing services will increasingly utilize autonomous vehicles to improve service efficiency and safety. However, autonomous vehicles will be required to perform many of the functions conventionally performed by human drivers, such as avoiding dangerous or difficult routes, and performing other navigation and routing tasks necessary to provide safe and efficient transportation. Such tasks may require the collection and processing of large quantities of data disposed on the autonomous vehicle.

BRIEF DESCRIPTION OF THE DRAWINGS

The embodiments herein may be better understood by referring to the following description in conjunction with the accompanying drawings in which like reference numerals indicate identically or functionally similar elements, of which.

DETAILED DESCRIPTION

Autonomous vehicles are vehicles having computers and control systems that perform driving and navigation tasks that a human driver conventionally performs. As autonomous vehicle technologies advance, ridesharing services will increasingly utilize autonomous vehicles to improve service efficiency and safety. However, autonomous vehicles will be required to perform many of the functions conventionally performed by human drivers, such as avoiding dangerous or difficult routes and performing other navigation and routing tasks necessary to provide safe and efficient transportation. Such tasks may require the collection and processing of large quantities of data disposed on the autonomous vehicle.

These autonomous vehicles have a limited amount of time per charge to navigate around routes to perceive objects through their sensors and learn therefrom. Additionally, the storage costs for sensor data can be prohibitively expensive, especially when scaling across a fleet of autonomous vehicles. In other words, there is a limited amount of data that a single autonomous vehicle can record during a trip, and as the amount of stored data increases, the more expensive storage of the data is.

Thus, the present technology addresses the need for an efficient process for continuous learning by each autonomous vehicle in the fleet of autonomous vehicles. More specifically, the present technology can learn over a network by utilizing an on-board continuous learning model and providing an update to the autonomous vehicle. The learnings can be limited to ensure safety of the autonomous vehicle after the update. Additionally, the learnings from each autonomous vehicle can be gathered and collected into a common stack periodically. For example, each autonomous vehicle can learn and update a kernel of a deep-learning model on-board the respective autonomous vehicle. Then, kernels of a fleet of autonomous vehicles can be averaged out or distilled (e.g., using knowledge distillation methods) into a joint kernel. In other words, autonomous vehicles can continuously learn and make changes to the deep-learning models on-board the autonomous vehicle while driving. The changes can then be periodically distilled into a single deep-learning model including learnings from a fleet of autonomous vehicles. Thus, the storage of data for each autonomous vehicle can be streamlined into storage for a single deep-learning model that is leveraged by the autonomous vehicles in the fleet.

Figure 1:
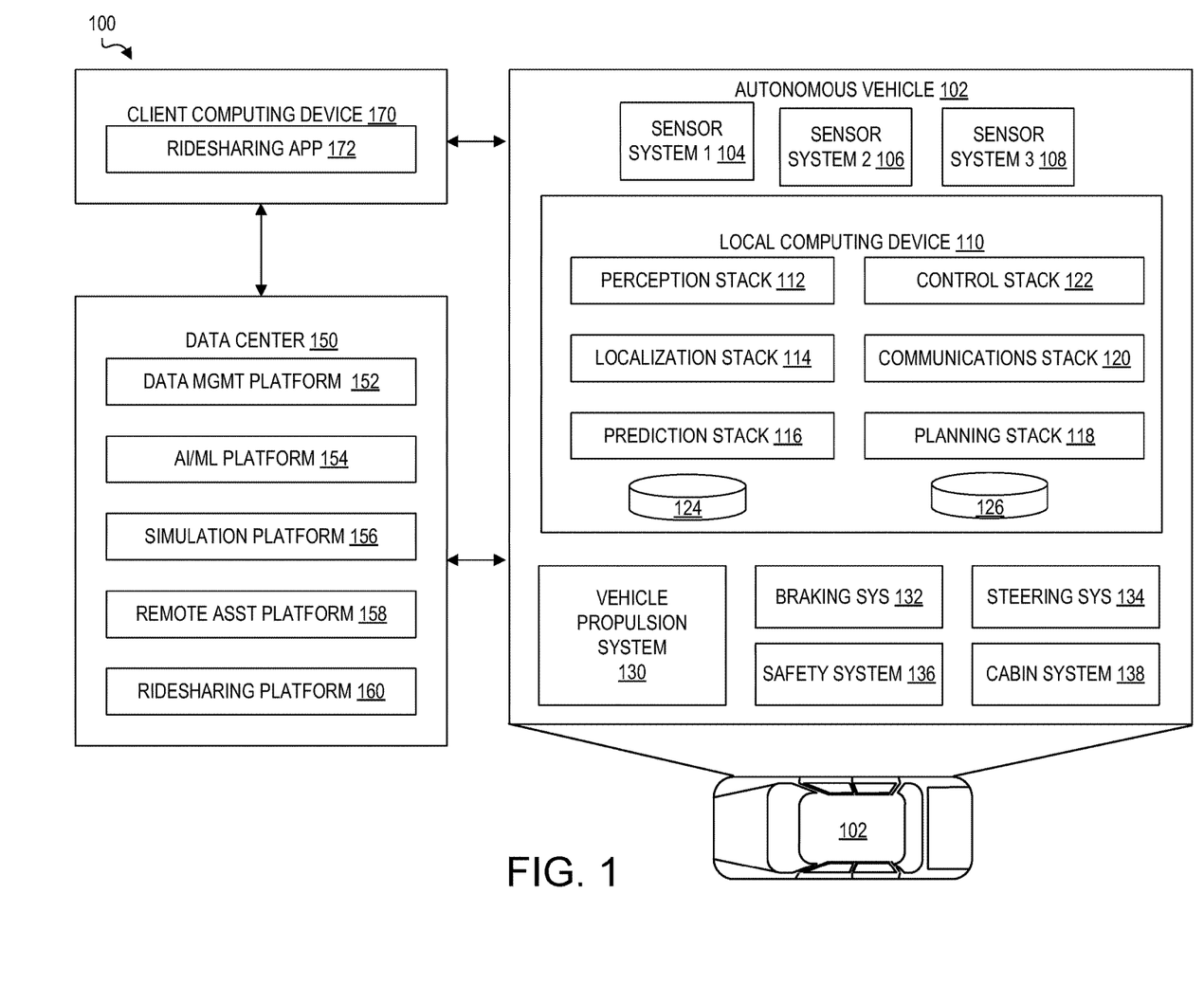
FIG. 1 illustrates an example of a system for managing one or more Autonomous Vehicles (AVs) in accordance with some aspects of the present technology.
Figure 2:
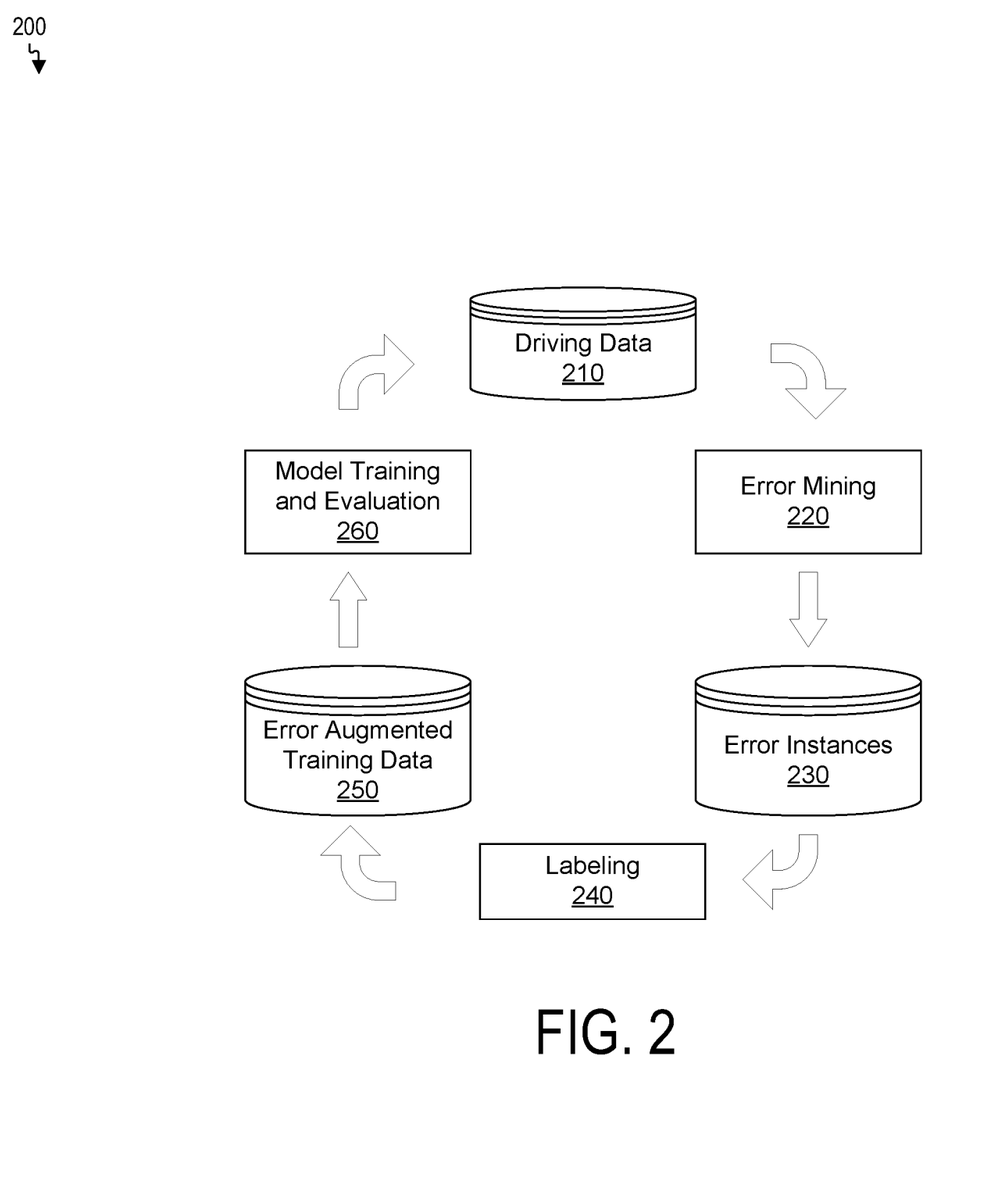
FIG. 2 illustrates an example diagram of a Continuous Learning Machine (CLM) for resolving uncommon scenarios in an AV in accordance with some aspects of the present technology.

A description of an AV management system and a continual learning machine (CLM) for the AV management system, as illustrated in FIGS. 1 and 2. An overview of a neural network lifecycle is disclosed in FIG. 3. An environment having a fleet of autonomous vehicles is disclosed in FIG. 4 and is followed by methods performed by the autonomous vehicles in FIGS. 5 and 6. The discussion then concludes with a brief description of example devices, as illustrated in FIG. 7. These variations shall be described herein as the various embodiments are set forth. The disclosure now turns to FIG. 1.

FIG. 1 illustrates an example of an autonomous vehicle (AV) management system 100. One of ordinary skill in the art will understand that, for the AV management system 100 and any system discussed in the present disclosure, there can be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 100 includes an AV 102, a data center 150, and a client computing device 170. The AV 102, the data center 150, and the client computing device 170 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 102 can navigate roadways without a human driver based on sensor signals generated by multiple sensor systems 104, 106, and 108. The sensor systems 104-108 can include different types of sensors and can be arranged about the AV 102. For instance, the sensor systems 104-108 can comprise Inertial Measurement Units (IMUs), cameras (e.g., still image cameras, video cameras, etc.), light sensors (e.g., light detection and ranging (LIDAR) systems, ambient light sensors, infrared sensors, etc.), RADAR systems, global positioning system (GPS) receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 104 can be a camera system, the sensor system 106 can be a LIDAR system, and the sensor system 108 can be a RADAR system. Other embodiments may include any other number and type of sensors.

The AV 102 can also include several mechanical systems that can be used to maneuver or operate the AV 102. For instance, the mechanical systems can include a vehicle propulsion system 130, a braking system 132, a steering system 134, a safety system 136, and a cabin system 138, among other systems. The vehicle propulsion system 130 can include an electric motor, an internal combustion engine, or both. The braking system 132 can include an engine brake, brake pads, actuators, and/or any other suitable componentry configured to assist in decelerating the AV 102. The steering system 134 can include suitable componentry configured to control the direction of movement of the AV 102 during navigation. The safety system 136 can include lights and signal indicators, a parking brake, airbags, and so forth. The cabin system 138 can include cabin temperature control systems, in-cabin entertainment systems, and so forth. In some embodiments, the AV 102 might not include human driver actuators (e.g., steering wheel, handbrake, foot brake pedal, foot accelerator pedal, turn signal lever, window wipers, etc.) for controlling the AV 102. Instead, the cabin system 138 can include one or more client interfaces (e.g., Graphical User Interfaces (GUIs), Voice User Interfaces (VUIs), etc.) for controlling certain aspects of the mechanical systems 130-138.

The AV 102 can additionally include a local computing device 110 that is in communication with the sensor systems 104-108, the mechanical systems 130-138, the data center 150, and the client computing device 170, among other systems. The local computing device 110 can include one or more processors and memory, including instructions that can be executed by the one or more processors. The instructions can make up one or more software stacks or components responsible for controlling the AV 102; communicating with the data center 150, the client computing device 170, and other systems; receiving inputs from riders, passengers, and other entities within the AV's environment; logging metrics collected by the sensor systems 104-108; and so forth. In this example, the local computing device 110 includes a perception stack 112, a mapping and localization stack 114, a prediction stack 116, a planning stack 118, a communications stack 120, a control stack 122, an AV operational database 124, and a high definition (HD) geospatial database 126, among other stacks and systems.

The perception stack 112 can enable the AV 102 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 104-108, the mapping and localization stack 114, the HD geospatial database 126, other components of the AV, and other data sources (e.g., the data center 150, the client computing device 170, third party data sources, etc.). The perception stack 112 can detect and classify objects and determine their current locations, speeds, directions, and the like. In addition, the perception stack 112 can determine the free space around the AV 102 (e.g., to maintain a safe distance from other objects, change lanes, park the AV, etc.). The perception stack 112 can also identify environmental uncertainties, such as where to look for moving objects, flag areas that may be obscured or blocked from view, and so forth. In some embodiments, an output of the prediction stack can be a bounding area around a perceived object that can be associated with a semantic label that identifies the type of object that is within the bounding area, the kinematic of the object (information about its movement), a tracked path of the object, and a description of the pose of the object (its orientation or heading, etc.). The bounding area may by defined on a grid that consists of a rectangular, cylindrical or spherical projection of the camera or LIDAR data.

The mapping and localization stack 114 can determine the AV's position and orientation (pose) using different methods from multiple systems (e.g., GPS, IMUS, cameras, LIDAR, RADAR, ultrasonic sensors, the HD geospatial database 126, etc.). For example, in some embodiments, the AV 102 can compare sensor data captured in real-time by the sensor systems 104-108 to data in the HD geospatial database 126 to determine its precise (e.g., accurate to the order of a few centimeters or less) position and orientation. The AV 102 can focus its search based on sensor data from one or more first sensor systems (e.g., GPS) by matching sensor data from one or more second sensor systems (e.g., LIDAR). If the mapping and localization information from one system is unavailable, the AV 102 can use mapping and localization information from a redundant system and/or from remote data sources.

The prediction stack 116 can receive information from the localization stack 114 and objects identified by the perception stack 112 and predict a future path for the objects. In some embodiments, the prediction stack 116 can output several likely paths that an object is predicted to take along with a probability associated with each path. For each predicted path, the prediction stack 116 can also output a range of points along the path corresponding to a predicted location of the object along the path at future time intervals along with an expected error value for each of the points that indicates a probabilistic deviation from that point. In some embodiments, the prediction stack 116 can output a probability distribution of likely paths or positions that the object is predicted to take.

The planning stack 118 can determine how to maneuver or operate the AV 102 safely and efficiently in its environment. For example, the planning stack 118 can receive the location, speed, and direction of the AV 102, geospatial data, data regarding objects sharing the road with the AV 102

(e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 102 from one point to another and outputs from the perception stack 112, localization stack 114, and prediction stack 116. The planning stack 118 can determine multiple sets of one or more mechanical operations that the AV 102 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 118 can select from multiple backup plans to carry out. For example, while preparing to change lanes to turn right at an intersection, another vehicle may aggressively cut into the destination lane, making the lane change unsafe. The planning stack 118 could have already determined an alternative plan for such an event. Upon its occurrence, it could help direct the AV 102 to go around the block instead of blocking a current lane while waiting for an opening to change lanes.

The control stack 122 can manage the operation of the vehicle propulsion system 130, the braking system 132, the steering system 134, the safety system 136, and the cabin system 138. The control stack 122 can receive sensor signals from the sensor systems 104-108 as well as communicate with other stacks or components of the local computing device 110 or a remote system (e.g., the data center 150) to effectuate operation of the AV 102. For example, the control stack 122 can implement the final path or actions from the multiple paths or actions provided by the planning stack 118. This can involve turning the routes and decisions from the planning stack 118 into commands for the actuators that control the AV's steering, throttle, brake, and drive unit.

The communications stack 120 can transmit and receive signals between the various stacks and other components of the AV 102 and between the AV 102, the data center 150, the client computing device 170, and other remote systems. The communications stack 120 can enable the local computing device 110 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communications stack 120 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 126 can store HD maps and related data of the streets upon which the AV 102 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal u-turn lanes; permissive or protected only right turn lanes; etc.). The traffic controls lane can include geospatial information of traffic signal lights, traffic signs, and other road objects and related attributes.

The AV operational database 124 can store raw AV data generated by the sensor systems 104-108, stacks 112-122, and other components of the AV 102 and/or data received by the AV 102 from remote systems (e.g., the data center 150, the client computing device 170, etc.). In some embodiments, the raw AV data can include HD LIDAR point cloud data, image data, RADAR data, GPS data, and other sensor data that the data center 150 can use for creating or updating AV geospatial data or for creating simulations of situations encountered by AV 102 for future testing or training of various machine learning algorithms that are incorporated in the local computing device 110.

The data center 150 can be a private cloud (e.g., an enterprise network, a co-location provider network, etc.), a public cloud (e.g., an IaaS network, a PaaS network, a SaaS network, or other CSP network), a hybrid cloud, a multi-cloud, and so forth. The data center 150 can include one or more computing devices remote to the local computing device 110 for managing a fleet of AVs and AV-related services. For example, in addition to managing the AV 102, the data center 150 may also support a ridesharing service, a delivery service, a remote/roadside assistance service, street services (e.g., street mapping, street patrol, street cleaning, street metering, parking reservation, etc.), and the like.

The data center 150 can send and receive various signals to and from the AV 102 and the client computing device 170. These signals can include sensor data captured by the sensor systems 104-108, roadside assistance requests, software updates, ridesharing pick-up and drop-off instructions, and so forth. In this example, the data center 150 includes a data management platform 152, an Artificial Intelligence/Machine Learning (AI/ML) platform 154, a simulation platform 156, a remote assistance platform 158, and a ridesharing platform 160, among other systems.

The data management platform 152 can be a "big data" system capable of receiving and transmitting data at high velocities (e.g., near real-time or real-time), processing a large variety of data and storing large volumes of data (e.g., terabytes, petabytes, or more of data). The varieties of data can include data having different structured (e.g., structured, semi-structured, unstructured, etc.), data of different types (e.g., sensor data, mechanical system data, ridesharing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 150 can access data stored by the data management platform 152 to provide their respective services.

The AI/ML platform 154 can provide the infrastructure for training and evaluating machine learning algorithms for operating the AV 102, the simulation platform 156, the remote assistance platform 158, the ridesharing platform 160, and other platforms and systems. Using the AI/ML platform 154, data scientists can prepare data sets from the data management platform 152; select, design, and train machine learning models; evaluate, refine, and deploy the models; maintain, monitor, and retrain the models; and so on.

The simulation platform 156 can enable testing and validation of the algorithms, machine learning models, neural networks, and other development efforts for the AV 102, the remote assistance platform 158, the ridesharing platform 160, and other platforms and systems. The simulation platform 156 can replicate a variety of driving environments and/or reproduce real-world scenarios from data captured by the AV 102, including rendering geospatial information and road infrastructure (e.g., streets, lanes, crosswalks, traffic lights, stop signs, etc.) obtained from a cartography platform; modeling the behavior of other vehicles, bicycles, pedestrians, and other dynamic elements; simulating inclement weather conditions, different traffic scenarios; and so on.

The remote assistance platform 158 can generate and transmit instructions regarding the operation of the AV 102. For example, in response to an output of the AI/ML platform 154 or other system of the data center 150, the remote assistance platform 158 can prepare instructions for one or more stacks or other components of the AV 102.

The ridesharing platform 160 can interact with a customer of a ridesharing service via a ridesharing application 172 executing on the client computing device 170. The client computing device 170 can be any type of computing system, including a server, desktop computer, laptop, tablet, smartphone, smart wearable device (e.g., smartwatch, smart eyeglasses or other Head-Mounted Display (HMD), smart ear pods, or other smart in-ear, on-ear, or over-ear device, etc.), gaming system, or other general purpose computing device for accessing the ridesharing application 172. The client computing device 170 can be a customer's mobile computing device or a computing device integrated with the AV 102 (e.g., the local computing device 110). The ridesharing platform 160 can receive requests to pick up or drop off from the ridesharing application 172 and dispatch the AV 102 for the trip.

FIG. 2 illustrates an example diagram of a CLM 200 that solves a long-tail prediction problem in an AV in accordance with some examples. The CLM 200 is a continual loop that iterates and improves based on continual feedback to learn and resolve driving situations experienced by the AV.

The CLM 200 begins with a fleet of AVs outfitted with sensors to record a real-world driving scene. In some cases, the fleet of AVs is situated in a suitable environment that represents challenging and diverse situations such as an urban environment to provide more learning opportunities. The AVs record the driving situations into a collection of driving data 210.

The CLM 200 includes an error mining 220 service to mine for errors and uses active learning to automatically identify error cases and scenarios having a significant difference between prediction and reality, which are added to a dataset of error instances 230. The error instances are long-tail scenarios that are uncommon and provide rich examples for simulation and training. The error instances 230 store high-value data and prevent storing datasets with situations that are easily resolved.

The CLM 200 also implements a labeling function 240 that includes both automated and manual data annotation of data stored in error augmented training data 250 and used for future predictions. The automated data annotation is performed by an ML labeling annotator that uses a neural network trained to identify and label error scenarios in the datasets. Using the ML labeling annotator enables significant scale, cost, and speed improvements that allow the CLM 200 to cover mores scenario of the long tail. The labeling function 240 also includes functionality to allow a human annotator to supplement the ML labeling function. By having both an automated ML labeling function and a manual (human) labeling annotator, the CLM 200 can be populated with dense and accurate datasets for prediction.

The final step of the CLM 200 is model training and evaluation 260. A new model (e.g., a neural network) is trained based on the error augmented training data 250, and the new model is tested extensively using various techniques to ensure that the new model exceeds the performance of the previous model and generalizes well to the nearly infinite variety of scenarios found in the various datasets. The model can also be simulated in a virtual environment and analyzed for performance. Once the new model has been accurately tested, the new model can be deployed in an AV to record driving data 210. The CLM 200 is a continual feedback loop that provides continued growth and learning to provide accurate models for an AV to implement.

In practice, the CLM can handle many uncommon scenarios, but the AV will occasionally need to account for new and infrequent scenarios. For example, an AV may encounter another motorist making an abrupt and sometimes illegal U-turn. The U-turn can be at a busy intersection or could be mid-block, but the U-turn will be a sparse data point as compared to more common behaviors such as moving straight, left turns, right turns, and lane changes. Applying CLM principles, an initial deployment model may not optimally predict U-turn situations, and error situations commonly include U-turns. As the dataset grows and more error scenarios of U-turns are identified, the model can be trained to sufficiently predict a U-turn and allow the AV to accurately navigate this scenario.

The CLM 200 can be applied to any number of scenarios, for example, a K-turn (or a 3-point turn), lane obstructions, construction, pedestrians, animated objects, animals, emergency vehicles, funeral processions, jaywalking, and so forth. The CLM 200 provides a mechanism for continued learning to account for diverse scenarios present in the physical world.

Figure 3:
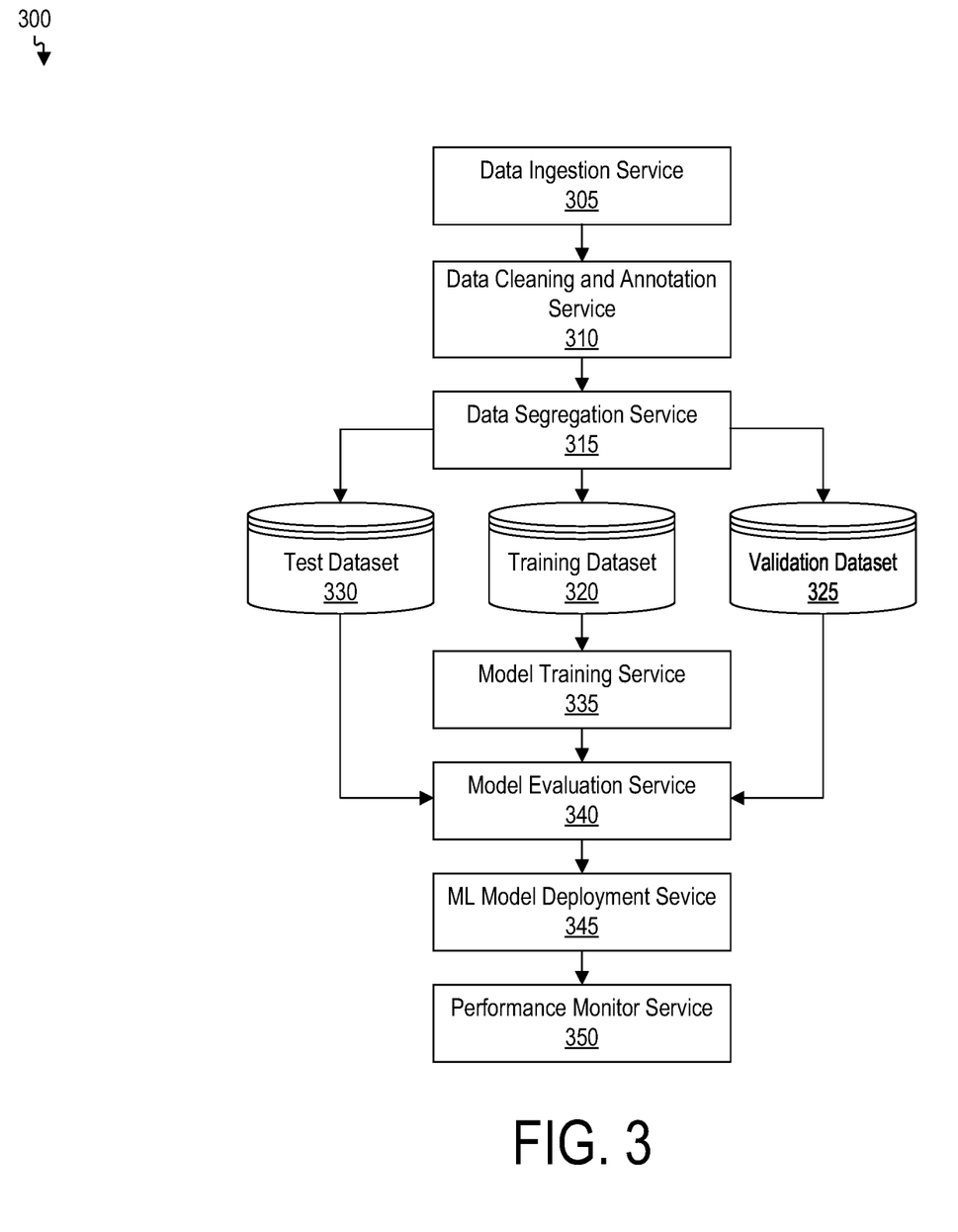
FIG. 3 illustrates an example lifecycle of a machine learning (ML) model in accordance with some aspects of the present technology.

FIG. 3 illustrates an example lifecycle 300 of an ML model in accordance with some examples. The first stage of the lifecycle 300 of an ML model is a data ingestion service 305 to generate datasets described below. ML models require a significant amount of data for the various processes described in FIG. 3 and the data persisted without undertaking any transformation to have an immutable record of the original dataset. The data itself can be generated by sensors attached to an AV, for example, but can also be provided from third-party sources such as publicly available dedicated datasets used for research purposes. The data ingestion service 305 provides a service that allows for efficient querying and end-to-end data lineage and traceability based on a dedicated pipeline for each dataset, data partitioning to take advantage of the multiple servers or cores, and spreading the data across multiple pipelines to reduce the overall time to reduce data retrieval functions.

In some cases, the data may be retrieved offline that decouples the producer of the data (e.g., an AV) from the consumer of the data (e.g., an ML model training pipeline). For offline data production, when source data is available from the producer (e.g., the AV), the producer publishes a message, and the data ingestion service 305 retrieves the data. In some examples, the data ingestion service 305 may be online, and the data is streamed from the producer (e.g., the AV) in real-time for storage in the data ingestion service 305.

After data ingestion service 305, a data preprocessing service preprocesses the data to prepare the data for use in the lifecycle 300 and includes at least data cleaning, data transformation, and data selection operations. The data preprocessing service 310 removes irrelevant data (data cleaning) and general preprocessing to transform the data into a usable form. In some examples, the data preprocessing service 310 may convert 3D LIDAR data (e.g., 3D point cloud data) into voxels. The data preprocessing service 310 includes labeling features relevant to the ML model, such as people, vegetation, vehicles, and structural objects in the case of an AV. In some examples, the data preprocessing service 310 may be a semi-supervised process performed by an ML to clean and annotate data that is complemented with manual operations such as labeling of error scenarios, identification of untrained features, etc.

After the data preprocessing service 310, data segregation service 315 separates data into at least a training dataset 320, a validation dataset 325, and a test dataset 330. Each of the training dataset 320, a validation dataset 325, and a test dataset 330 are distinct and do not include any common data to ensure that evaluation of the ML model is isolated from the training of the ML model.

The training dataset 320 is provided to a model training service 335 that uses a supervisor to perform the training or the initial fitting of parameters (e.g., weights of connections between neurons in artificial neural networks) of the ML model. The model training service 335 trains the ML model based on a gradient descent or stochastic gradient descent to fit the ML model based on an input vector (or scalar) and a corresponding output vector (or scalar). Training of the ML model adjusts the parameters of the ML model such as weights and biases of the fully connected or convolutional neural network layers.

After training, the ML model is evaluated at a model evaluation service 340 using data from the validation dataset 325 and different evaluators to tune the hyperparameters of the ML model. The predictive performance of the ML model is evaluated based on predictions on the validation dataset 325 and iteratively tunes the hyperparameters based on the different evaluators until the best fit for the ML model is identified. After the best fit is identified, the test dataset 330, or holdout data set, is used as a final check to perform an unbiased measurement on the performance of the final ML model by the model evaluation service 340. In some cases, the final dataset that is used for the final, unbiased measurement can be referred to as the validation dataset, and the dataset used for hyperparameter tuning can be referred to as the test dataset.

After the ML model has been evaluated by the model evaluation service 340, an ML model deployment service 345 can deploy the ML model into an application or a suitable device. The deployment can be into a further test environment such as a simulation environment or into another controlled environment to further test the ML model. In the case of an AV, the ML model may need to undergo further evaluation inside a simulated environment and, after further validation, could be deployed in the AV. In some examples, the ML model could be implemented as part of the perception stack 112 to detect objects.

After deployment by the ML model deployment service 345, a performance monitor service 350 monitors for the performance of the ML model. In some cases, the performance monitor service 350 can also record performance data such as driving data that can be ingested via the data ingestion service 305 to provide further data, additional scenarios, and further enhance the training of ML models.

Figure 4:
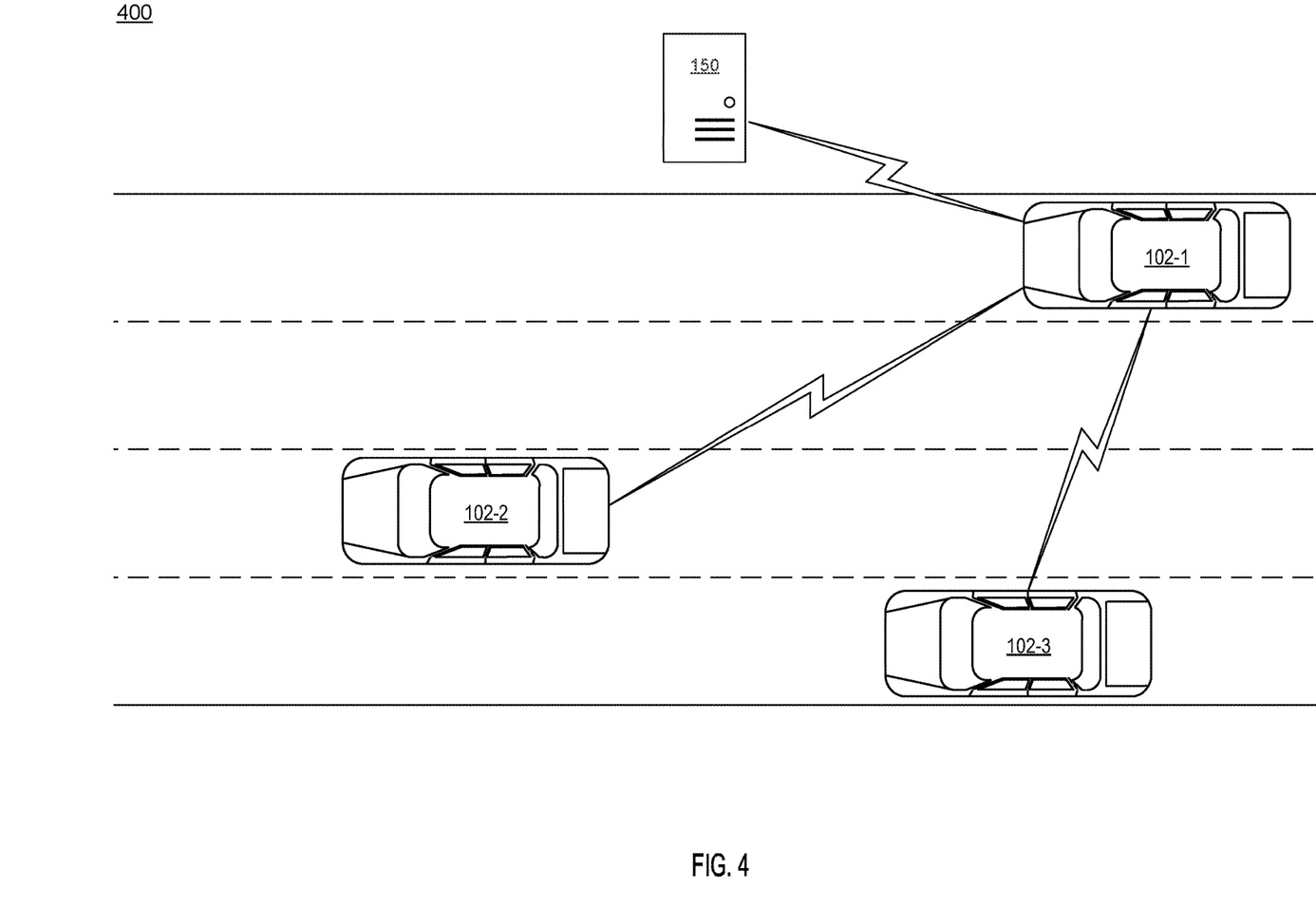
FIG. 4 illustrates an environment having a fleet of autonomous vehicles in accordance with some aspects of the present technology.

FIG. 4 illustrates an environment 400 having a fleet of autonomous vehicles 102-1, 102-2, 102-3 (collectively autonomous vehicle 102). More specifically, each autonomous vehicle 102 can communicate with all other autonomous vehicles 102 in the fleet. Additionally, each autonomous vehicle 102 can communicate with a server or data center 150, hosting or storing a joint kernel for a deep-learning model. As discussed above, each autonomous vehicle 102 can perceive objects in environment 400 through sensors 104-108 and perception stack 112. For example, autonomous vehicle 102 can receive sensor data and perceive or produce objects in the sensor data. As an autonomous vehicle 102 perceives these objects and makes predictions about trajectories of the objects, autonomous vehicle 102 learns (e.g., via steps 210-260 of CLM 200) about the accuracy of perception and predictions of the objects in environment 400.

In some embodiments, autonomous vehicle 102 has a specified learning budget that limits the total change can happen to the deep-learning model for learning. In some embodiments, the learning budget is based on a fleet size, a number of autonomous vehicles operating, a constant value, a threshold value, a type of deep-learning model, and/or a value determined by simulating a safety test. In some embodiments, the learning budget is used to calculate a learning limit, which causes autonomous vehicle 102 to reduce or stop learning after the learning limit is reached. In some embodiments, the learning limit is calculated by spreading out the learning budget over a wide time range, using a constant learning limit and setting the limit to zero when the learning budget is reached, selectively learning in certain environments, and/or selectively learning for failed perception or predictions. Additionally, the learning budget and learning limit can be used to limit how much a single autonomous vehicle changes a deep-learning model on-board the autonomous vehicle. In other words, the learning budget and learning limit can be effective to prevent excessive changes to the deep-learning model, while permitting continuous learning by autonomous vehicles 102. Thus, the learning limit can reduce risks and errors (e.g., from small sample sizes) being introduced into the joint kernel of the deep-learning model without testing by the whole fleet. The changes to the deep-learning model due to updates can be measured by taking a norm of the difference between the original model parameters and final model parameters after the update. The norm can be L0 (maximum), L1 (absolute) or L2 (squared). The model parameters can be weights and bias of fully connected, convolutional or any other layer of the deep neural network. The model parameter can also be any other parameter of a neural network layer such as any of the parameters of a batch-normalization layer.

Autonomous vehicle 102 can calculate and/or generate a learning update to deep-learning models. After generating the learning update, autonomous vehicle 102 can apply the learning update to a kernel of the deep-learning model on-board autonomous vehicle 102, provided that the learning limit is not reached yet. Additionally and/or alternatively, learning update may be reduced in size to make sure that the changes to the deep learning model meet the learning budget. In some embodiments, autonomous vehicle 102 can only apply the learning update to deep-learning models that are insignificant to safety or safe operation of autonomous vehicle 102. Additionally, autonomous vehicle 102 can then perform a safety test on autonomous vehicle 102. In other words, autonomous vehicle 102 can self-test the operations of autonomous vehicle 102 to ensure safe operation and control of autonomous vehicle 102. In some embodiments, the learning update may be in the form of a change in the deep learning model parameters, and application of the update is adding the update on the existing deep learning model parameters. In some embodiments, the learning update may be in the form of new values for the deep learning model parameters, and application of the update is replacing the existing deep learning model parameters with the update values.

In some embodiments, the safety self-test can include checks that test the accuracy of perception, predictions, tracking, planning with the deep-learning kernels for predetermined test scenarios. In some embodiments, the safety self-test can include checks that test the accuracy of perception, predictions, tracking, planning with the deep-learning kernels for the most recent sensor data received from sensors 104-108 of autonomous vehicle 102. In some embodiments, the safety self-test can include checks verifying the difference between the outputs between the test against predetermined test sets and the most recent sensor data. After validating the safety and/or comfort of the updated operations of autonomous vehicle 102, autonomous vehicle 102 can drive with the updated kernel for the deep-learning model.

As further shown in FIG. 4, one autonomous vehicle (e.g., autonomous vehicle 102-1) can communicate with another autonomous vehicle (e.g., autonomous vehicle 102-2). For example, autonomous vehicle 102-1 can generate a learning update to a kernel of a deep-learning model on-board autonomous vehicle 102-1. Autonomous vehicle 102-1 can then send the learning update to one or more of the autonomous vehicle 102-2 and data center 150. Autonomous vehicle 102-2 can then apply the learning update to a deep-learning model on-board autonomous vehicle 102-2. Additionally, autonomous vehicle 102-2 can also perform a safety self-test to ensure safe operations of autonomous vehicle 102-2. After validating the safety and/or comfort of the updated operations of autonomous vehicle 102-2, autonomous vehicle 102-2 can drive with the updated kernel for the deep-learning model.

Additionally, autonomous vehicle 102-2 can generate another learning update to a kernel of a deep-learning model on-board autonomous vehicle 102-2 based on sensor data received from sensors on-board autonomous vehicle 102-2. Both autonomous vehicle 102-1 and autonomous vehicle 102-2 can respectively send the learning update and another learning update to one or more of the autonomous vehicle 102-3 and data center 150. Autonomous vehicle 102-3 can receive the learning update and the another learning update and generate a third learning update based on the learning update and the another learning update. In some embodiments, the third learning update can be calculated by arithmetic averaging and/or deep learning knowledge distillation. Then, autonomous vehicle 102-3 can apply the third learning update to a kernel of a deep-learning model on-board autonomous vehicle 102-3 and perform a safety self-test to ensure safe operations of autonomous vehicle 102-3. After validating the safety and/or comfort of the updated operations of autonomous vehicle 102-3, autonomous vehicle 102-3 can drive with the updated kernel for the deep-learning model.

In some embodiments, data center 150 can host a joint kernel that each autonomous vehicle 102 of the fleet can access and use to operate safely. The joint kernel can be updated by the learning updates generated by autonomous vehicles 102. For example, autonomous vehicle 102-1 can send the learning update to data center 150, which can be applied to the joint kernel. In some embodiments, the learning updates from each autonomous vehicle 102 can be averaged out or distilled (e.g., using knowledge distillation methods) and applied to the joint kernel. The joint kernel can then be sent to or retrieved by autonomous vehicles 102. Autonomous vehicles 102 can then drive with the updated joint kernel. In some embodiments, autonomous vehicles 102 can perform a safety self-test of the autonomous vehicle 102 with the joint kernel applied. It is also contemplated that the safety self-test can be skipped when the joint kernel is verified and/or tested by data center 150.

Figure 5:
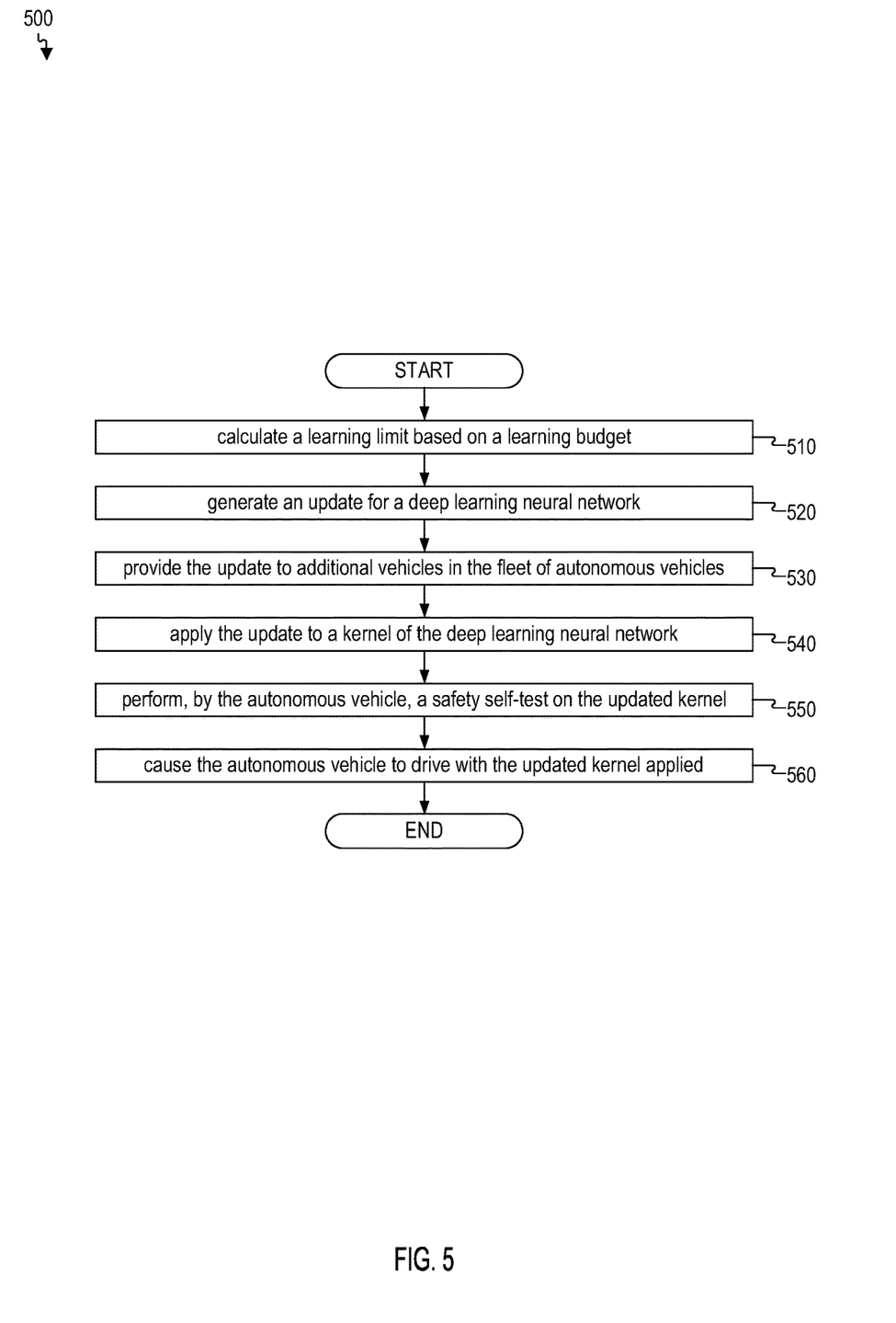
FIG. 5 is a flowchart of a method for sharing knowledge learned by an autonomous vehicle of a fleet in accordance with some aspects of the present technology.

FIG. 5 illustrates an example method 500 for sharing knowledge learned by an autonomous vehicle of a fleet. Although the example method 500 depicts a particular sequence of operations, the sequence may be altered without departing from the scope of the present disclosure. For example, some of the operations depicted may be performed in parallel or in a different sequence that does not materially affect the function of the method 500. In other examples, different components of an example device or system that implements the method 500 may perform functions at substantially the same time or in a specific sequence.

According to some embodiments, method 500 includes calculating 510 a learning limit based on the learning budget. For example, local computing device 110 illustrated in FIG. 1 may calculate 510 a learning limit based on the learning budget. In some embodiments, generating the update occurs after reaching the learning limit. In some embodiments, the learning budget is based on a number of autonomous vehicles in the fleet of autonomous vehicles.

According to some embodiments, method 500 includes generating 520 an update for a continuous deep learning neural network on-board the autonomous vehicle based on driving scenarios encountered by the autonomous vehicle during its deployment. For example, local computing device 110 illustrated in FIG. 1 may generate 520 an update for a continuous deep learning neural network on-board the autonomous vehicle based on driving scenarios encountered by the autonomous vehicle during its deployment. In some embodiments, generating 520 an update may comprise retraining the deep neural network based additional training data which are chosen from scenarios where accuracy of the perception or predictions are low. In some embodiments, generating 520 an update may comprise applying a single or multiple back propagation steps. In some embodiments, generating 520 an update may comprise application of a numerical optimization algorithms such as gradient methods or evolutionary optimization methods.

According to some embodiments, method 500 includes providing 530 the update for the continuous deep learning neural network to additional vehicles in the fleet on autonomous vehicles. For example, local computing device 110 illustrated in FIG. 1 may provide 530 the update for the continuous deep learning neural network to additional vehicles in the fleet on autonomous vehicles. In some embodiments, the update for the continuous deep learning neural network is configured to be incorporated into a joint kernel for use by the additional vehicles in the fleet on autonomous vehicles. In some embodiments, the continuous deep learning neural network is used in at least one of the perception stack, prediction stack, and planning stack.

According to some embodiments, method 500 includes applying 540 the update for the continuous deep learning neural network to a kernel of the deep learning neural network on the autonomous vehicle to generate an updated kernel on the autonomous vehicle. For example, local computing device 110 illustrated in FIG. 1 may apply 540 the update for the continuous deep learning neural network to a kernel of the deep learning neural network on the autonomous vehicle to generate an updated kernel on the autonomous vehicle. In some embodiments, applying 540 the update includes at least one of averaging the update and the additional update or using knowledge distillation on the update and the additional update According to some embodiments, method 500 includes performing 550, by the autonomous vehicle, a safety self-test on the updated kernel. For example, local computing device 110 illustrated in FIG. 1 may perform 550, by the autonomous vehicle, a safety self-test on the updated kernel. In some embodiments, the safety self-test includes checks that determine accuracy of the updated kernel. For example, the safety self-test can compare a performance of a deep-learning model with the updated kernel against the performance of the deep-learning model with a previous kernel.

According to some embodiments, method 500 includes causing 560 the autonomous vehicle to drive with the updated kernel applied. For example, local computing device 110 illustrated in FIG. 1 may cause 560 the autonomous vehicle to drive with the updated kernel applied.

Figure 6:
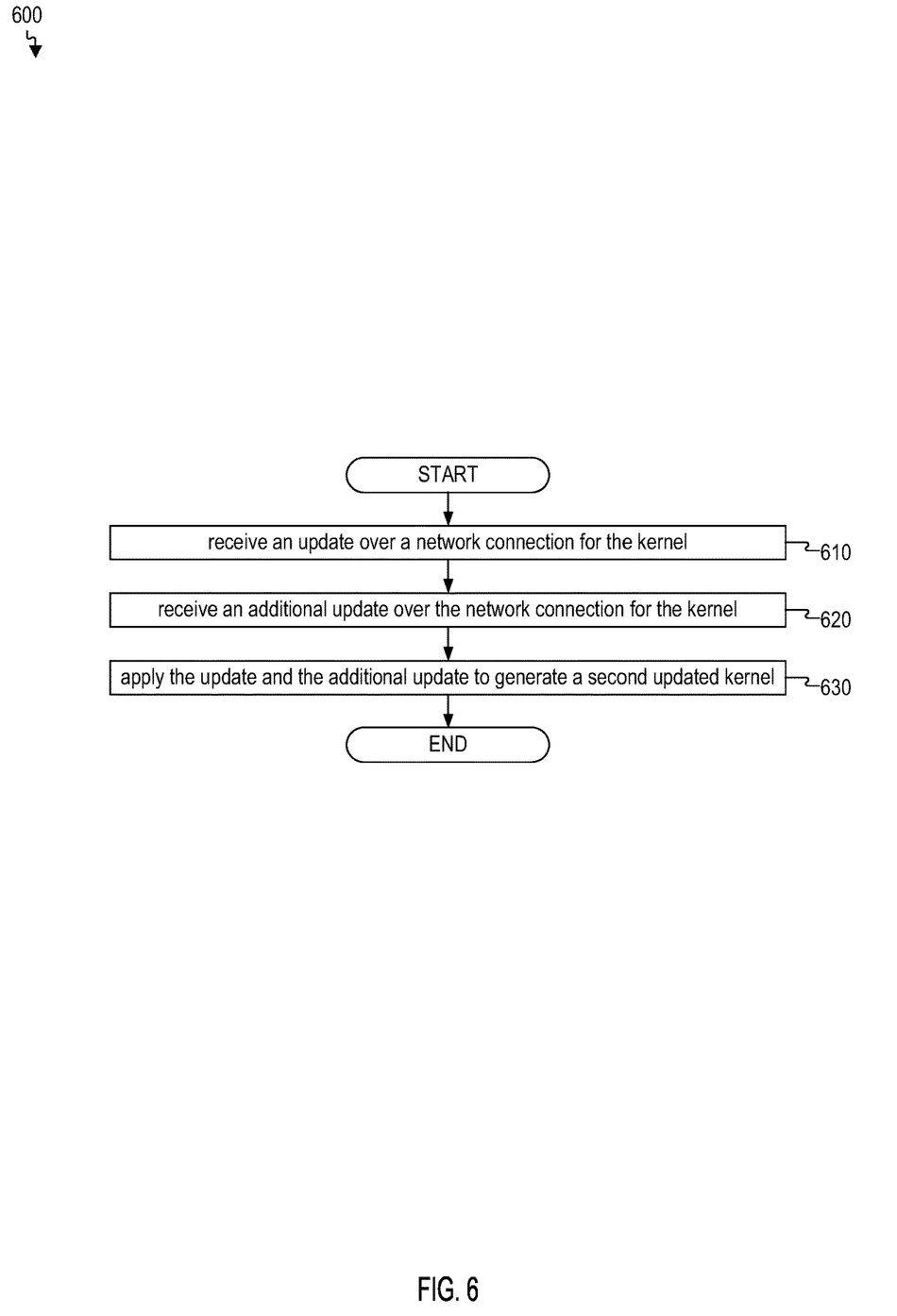
FIG. 6 is a flowchart of a method for utilizing shared knowledge by an autonomous vehicle of a fleet in accordance with some aspects of the present technology.
Figure 7:
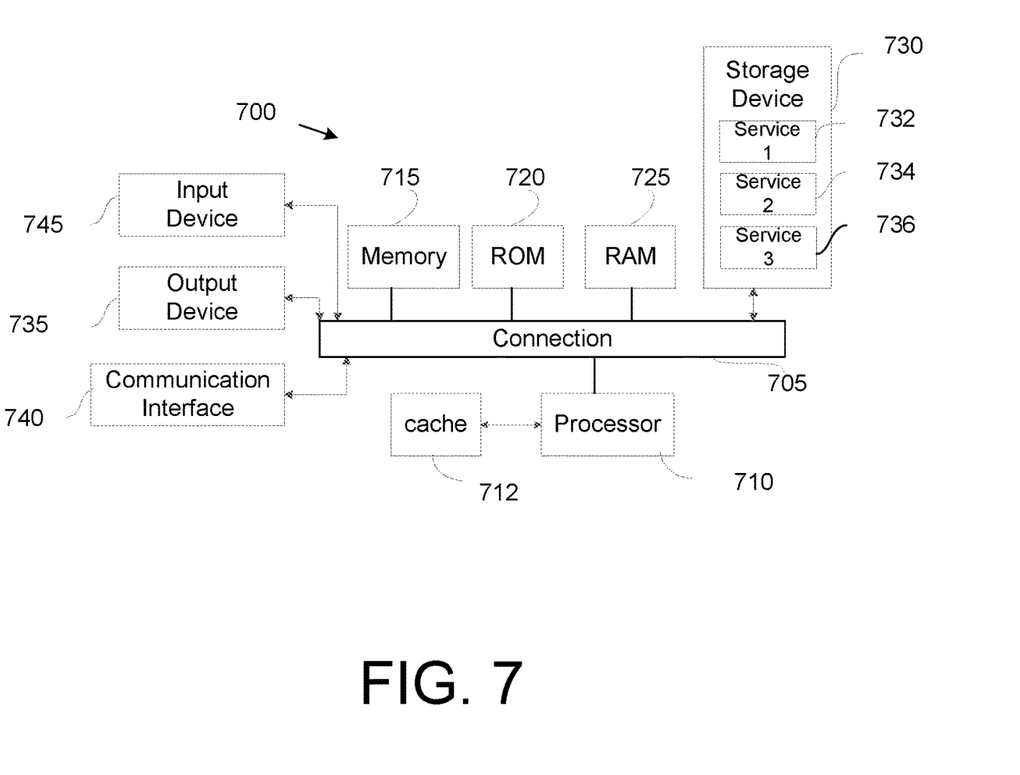
FIG. 7 shows an example of a system for implementing certain aspects of the present technology.

FIG. 6 illustrates an example method 600 for sharing knowledge learned by an autonomous vehicle of a fleet. Although the example method 600 depicts a particular sequence of operations, the sequence may be altered without departing from the scope of the present disclosure. For example, some of the operations depicted may be performed in parallel or in a different sequence that does not materially affect the function of the method 600. In other examples, different components of an example device or system that implements the method 600 may perform functions at substantially the same time or in a specific sequence.

According to some embodiments, method 600 includes receiving 610 an update over a network connection for the kernel from a first other autonomous vehicle in the fleet of autonomous vehicles. For example, local computing device 110 illustrated in FIG. 1 may receive 610 an update over a network connection for the kernel from a first other autonomous vehicle in the fleet of autonomous vehicles. In some embodiments, the update received over the network connection is generated by the first other autonomous vehicle in the fleet of autonomous vehicles.

According to some embodiments, method 600 includes receiving 620 an additional update over the network connection for the kernel from a second other autonomous vehicle in the fleet of autonomous vehicles. For example, local computing device 110 illustrated in FIG. 1 may receive 620 an additional update over the network connection for the kernel from a second other autonomous vehicle in the fleet of autonomous vehicles. In some embodiments, the additional update received over a network connection is generated by the second other autonomous vehicle in the fleet of autonomous vehicles.

According to some embodiments, method 600 includes applying 630 the update received over the network connection from the first other autonomous vehicle and the additional update received over a network connection from the second other autonomous vehicle to the kernel of the continuous deep learning neural network to generate a second updated kernel. For example, local computing device 110 illustrated in FIG. 1 may apply 630 the update received over the network connection from the first other autonomous vehicle and the additional update received over a network connection from the second other autonomous vehicle to the kernel of the continuous deep learning neural network to generate a second updated kernel.

In some embodiments, the fleet of autonomous vehicles 102 can utilize both method 500 and method 600. For example, one autonomous vehicle can simultaneously generate a learning update (e.g., method 500) and receive another learning update (e.g., method 600). Additionally, one autonomous vehicle can generate a learning update (e.g., method 500), while another autonomous vehicle in the fleet of autonomous vehicles can receive the learning update (e.g., method 600).

While the present technology has been described with respect to particular technology stacks of autonomous vehicles, its should be appreciated that the present technology can pertain to any technology stack, or even to any deployment of continuous learning models across multiple instances. Such deployments are not limited to autonomous vehicle deployments. For example, the present technology could pertain to learning of a model on a personal computing device or a cloud instance wherein the learnings can be shared and used to update other instances of the continuous learning model on other personal computing devices or cloud instances.

FIG. 7 shows an example of computing system 700, which can be for example any computing device making up autonomous vehicle 102, local computing device 110, data center 150, client computing device 170, or any component thereof in which the components of the system are in communication with each other using connection 705. Connection 705 can be a physical connection via a bus, or a direct connection into processor 710, such as in a chipset architecture. Connection 705 can also be a virtual connection, networked connection, or logical connection.

In some embodiments, computing system 700 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 700 includes at least one processing unit (CPU or processor) 710 and connection 705 that couples various system components including system memory 715, such as read-only memory (ROM) 720 and random access memory (RAM) 725 to processor 710. Computing system 700 can include a cache of high-speed memory 712 connected directly with, in close proximity to, or integrated as part of processor 710.

Processor 710 can include any general purpose processor and a hardware service or software service, such as services 732, 734, and 736 stored in storage device 730, configured to control processor 710 as well as a special-purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric.

To enable user interaction, computing system 700 includes an input device 745, which can represent any number of input mechanisms, such as a microphone for speech, a touch-sensitive screen for gesture or graphical input, keyboard, mouse, motion input, speech, etc. Computing system 700 can also include output device 735, which can be one or more of a number of output mechanisms known to those of skill in the art. In some instances, multimodal systems can enable a user to provide multiple types of input/output to communicate with computing system 700. Computing system 700 can include communications interface 740, which can generally govern and manage the user input and system output. There is no restriction on operating on any particular hardware arrangement, and therefore the basic features here may easily be substituted for improved hardware or firmware arrangements as they are developed.

Storage device 730 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 730 can include software services, servers, services, etc., that when the code that defines such software is executed by the processor 710, it causes the system to perform a function. In some embodiments, a hardware service that performs a particular function can include the software component stored in a computer-readable medium in connection with the necessary hardware components, such as processor 710, connection 705, output device 735, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

What is claimed is:

1. A computer-implemented method for enabling sharing of knowledge learned by an autonomous vehicle to a fleet of autonomous vehicles, the method comprising:
    generating an update for a continuous deep learning neural network on-board the autonomous vehicle based on driving scenarios encountered by the autonomous vehicle during its deployment;
    providing the update for the continuous deep learning neural network to additional vehicles in the fleet on autonomous vehicles, wherein the update for the continuous deep learning neural network is configured to be incorporated into a joint kernel for use by the additional vehicles in the fleet on autonomous vehicles; and
    causing the autonomous vehicle to drive with the updated kernel applied; and
    determining a learning budget wherein the learning budget is a maximum total change to the deep-learning neural network and calculating a learning limit by evenly distributing the learning budget across a me range, using the learning limit and setting the constant learning limit to zero when the learning budget is reached, wherein generating update occurs after reaching the learning limit.

2. The computer-implemented method of claim 1, further comprising: applying the update for the continuous deep learning neural network to a kernel of the deep learning neural network on the autonomous vehicle to generate an updated kernel on the autonomous vehicle; and
    performing, by the autonomous vehicle, a safety self-test on the updated kernel.

3. The computer-implemented method of claim 2, wherein the safety self-test includes checks that determine accuracy of the updated kernel.

4. The computer-implemented method of claim 1, wherein the continuous deep learning neural network is used in at least one of the perception stack, prediction stack, and planning stack.

5. The computer-implemented method of claim 1, further comprising:

receiving an update over a network connection for the kernel of the continuous deep learning neural network from another autonomous vehicle in the fleet of autonomous vehicles;

applying the update received over the network connection to the kernel of the continuous deep learning neural network to generate a second updated kernel; and performing, by the autonomous vehicle, a safety self-test on the second updated kernel.

6. The computer-implemented method of claim 1, wherein the learning limit is based on at least one of a fleet size, a number of autonomous vehicles operating, a constant value, a threshold value, a type of deep-learning model, and a value determined by simulating a safety test and wherein the learning limit limits how much a single autonomous vehicle changes the deep learning neural network on-board the autonomous vehicle.

7. The computer-implemented method of claim 6, wherein the learning budget is based on a number of autonomous vehicles in the fleet of autonomous vehicles.

8. The computer-implemented method of claim 1, further comprising:

receiving an update over a network connection for the kernel from a first other autonomous vehicle in the fleet of autonomous vehicles, wherein the update received over the network connection is generated by the first other autonomous vehicle in the fleet of autonomous vehicles;

receiving an additional update over the network connection for the kernel from a second other autonomous vehicle in the fleet of autonomous vehicles, wherein the additional update received over a network connection is generated by the second other autonomous vehicle in the fleet of autonomous vehicles; and applying the update received over the network connection from the first other autonomous vehicle and the additional update received over a network connection from the second other autonomous vehicle to the kernel of the continuous deep learning neural network to generate a second updated kernel.

9. The computer-implemented method of claim 8, wherein applying the update comprises one of averaging the update and the additional update or using knowledge distillation on the update and the additional update.

10. A system comprising:
a storage configured to store instructions;
a processor configured to execute the instructions and cause the processor to:
generate an update for a continuous deep learning neural network on-board the autonomous vehicle based on driving scenarios encountered by the autonomous vehicle during its deployment,
provide the update for the continuous deep learning neural network to additional vehicles in the fleet on autonomous vehicles, wherein the update for the continuous deep learning neural network is configured to be incorporated into a joint kernel for use by the additional vehicles in the fleet on autonomous vehicles; and
cause the autonomous vehicle to drive with the updated kernel applied; and
determining a learning budget, wherein the learning budget is a maximum total change to the deep-learning neural network and calculating a learning limit by evenly distributing the learning budget across a time range, using the learning limit and setting the constant learning limit to zero when the earning budget is reached, wherein generating the update occurs after reaching the learning limit.

11. The system of claim 10, wherein the processor is configured to execute the instructions and cause the processor to:
apply the update for the continuous deep learning neural network to a kernel of the deep learning neural network on the autonomous vehicle to generate an updated kernel on the autonomous vehicle; and
perform, by the autonomous vehicle, a safety self-test on the updated kernel.

12. The system of claim 10, wherein the continuous deep learning neural network is used in at least one of the perception stack, prediction stack, and planning stack.

13. The system of claim 10, wherein the processor is configured to execute the instructions and cause the processor to:
receive an update over a network connection for the kernel of the continuous deep learning neural network from another autonomous vehicle in the fleet of autonomous vehicles;
apply the update received over the network connection to the kernel of the continuous deep learning neural network to generate a second updated kernel; and
perform, by the autonomous vehicle, a safety self-test on the second updated kernel.

14. The system of claim 10, wherein e learning limit is based on at least one of a fleet size, a number of autonomous vehicles operating, a constant value, a threshold value, a type deep-learning model, and a value determined by simulating a safety test, and wherein the learning limit limits how much a single autonomous vehicle changes the deep learning neural network on-board the autonomous vehicle.

15. The system of claim 10, wherein the processor is configured to execute the instructions and cause the processor to:
receive an update over a network connection for the kernel from a first other autonomous vehicle in the fleet of autonomous vehicles, wherein the update received over the network connection is generated by the first other autonomous vehicle in the fleet of autonomous vehicles;
receive an additional update over the network connection for the kernel from a second other autonomous vehicle in the fleet of autonomous vehicles, wherein the additional update received over a network connection is generated by the second other autonomous vehicle in the fleet of autonomous vehicles; and
apply the update received over the network connection from the first other autonomous vehicle and the additional update received over a network connection from the second other autonomous vehicle to the kernel of the continuous deep learning neural network to generate a second updated kernel.

16. A non-transitory computer readable medium comprising instructions, the instructions, when executed by a computing system, cause the computing system to:
generate an update for a continuous deep learning neural network on-board the autonomous vehicle based on driving scenarios encountered by the autonomous vehicle during its deployment;
provide the update for the continuous deep learning neural network to additional vehicles in the fleet on autonomous vehicles, wherein the update for the continuous deep learning neural network is configured to be incorporated into a joint kernel for use by the additional vehicles in the fleet on autonomous vehicles; and cause the autonomous vehicle to drive with the updated kernel applied, and determining learning budget, wherein the learning budget is a maximum total change to the deep-learning neural network and calculating learning limit by evenly distributing the earning budget across a time range, using the learning limit and setting the constant learning limit to zero when the learning budget is reached, wherein generating the update occurs after reaching the learning limit.

17. The computer readable medium of claim 16, wherein the computer readable medium further comprises instructions that, when executed by the computing system, cause the computing system to:

apply the update for the continuous deep learning neural network to a kernel of the deep learning neural network on the autonomous vehicle to generate an updated kernel on the autonomous vehicle; and perform, by the autonomous vehicle, a safety self-test on the updated kernel.

18. The computer readable medium of claim 16, the continuous deep learning neural network is used in at least one of the perception stack, prediction stack, and planning stack.

19. The computer readable medium of claim 16, wherein the computer readable medium further comprises instructions that, when executed by the computing system, cause the computing system to:

receive an update over a network connection for the kernel of the continuous deep learning neural network from another autonomous vehicle in the fleet of autonomous vehicles;

apply the update received over the network connection to the kernel of the continuous deep learning neural network to generate a second updated kernel; and perform, by the autonomous vehicle, a safety self-test on the second updated kernel.

20. The computer readable medium of claim 16, wherein the learning limit is based on at least one of a fleet size, a number of autonomous vehicles operating, a constant value, a threshold value, a type of deep-learning model, and a value determined by simulating a safety test and wherein the learning limit limits how much a single autonomous vehicle changes the deep learning neural network on-board the autonomous vehicle.

* * * * *